United States Patent [19]

Rogers et al.

[11] Patent Number: 5,317,842
[45] Date of Patent: Jun. 7, 1994

[54] FOLD AND ROLL RETRACTABLE LOCATOR

[75] Inventors: Orley D. Rogers, Farwell; Kenneth E. Staten, Clare, both of Mich.

[73] Assignee: Stageright Corporation, Clare, Mich.

[21] Appl. No.: 923,297

[22] Filed: Jul. 31, 1992

[51] Int. Cl.⁵ .............................................. E04H 3/26
[52] U.S. Cl. .......................................... 52/7; 52/126.5;
403/246; 403/174
[58] Field of Search ............. 52/479, 481, 508, 126.5,
52/585, 701, 704, 711, 7; 248/188; 182/222;
403/246, 174, 178, 170

[56] References Cited

U.S. PATENT DOCUMENTS

| | | | |
|---|---|---|---|
| 2,335,046 | 11/1943 | Droeger | 182/222 X |
| 2,602,012 | 7/1952 | Doty | 311/114 |
| 2,669,117 | 2/1954 | Fuhrmann | 72/135 |
| 2,978,754 | 4/1961 | Wilson | 20/1.123 |
| 3,168,793 | 2/1965 | Gibson | 403/246 X |
| 3,354,596 | 11/1967 | Schafer | 52/646 |
| 4,493,136 | 1/1985 | Groutage et al. | 52/711 X |
| 4,599,010 | 7/1986 | Hocking | 403/246 X |
| 4,638,604 | 1/1987 | Rogers et al. | 52/6 |
| 4,951,925 | 8/1990 | Schultz et al. | 403/245 X |
| 5,028,164 | 7/1991 | Williams | 403/246 |

FOREIGN PATENT DOCUMENTS

| | | | |
|---|---|---|---|
| 3114590 | 10/1981 | Fed. Rep. of Germany . | |
| 29646 | 9/1958 | Finland | 182/222 |
| 586248 | 12/1977 | U.S.S.R. | 52/126.5 |
| 1029131 | 5/1966 | United Kingdom | 52/126.5 |
| 1340185 | 3/1970 | United Kingdom . | |
| 1432075 | 1/1974 | United Kingdom . | |

Primary Examiner—Peter M. Cuomo
Assistant Examiner—Jerry Redman
Attorney, Agent, or Firm—Barnes, Kisselle, Raisch, Choate, Whittemore & Hulbert

[57] ABSTRACT

A fold and roll platform assembly having a pair of platform panels, and support units for supporting the platform panels on an underlying support structure. Each support unit has a locator pin mounted on a frame for movement from a retracted position to an upwardly extending position for engagement in a hole in a platform panel to locate the panel. The locator pin can be retracted into a recess provided in the frame.

11 Claims, 4 Drawing Sheets

FOLD AND ROLL RETRACTABLE LOCATOR

FIELD OF INVENTION

Retractable locators for the panels of portable foldable platform stage assemblies.

BACKGROUND AND FEATURES OF THE INVENTION

A fold and roll platform assembly has a pair of platform panels movable from a collapsed position with the panels closely adjacent each other to an operative position in a common plane. In accordance with this invention, the panels are carried on a supporting frame by support units having retractable locator pins. Each locator pin is preferably supported for pivotal movement from a retracted position to an upwardly extending position to engage and locate a platform panel. As provided in the embodiments of the invention disclosed, a recess is provided for receiving the locator pin when retracted. The locator pin projects above the recess when in its upwardly extending position.

One object of this invention is to provide locator pins for the panels of a fold and roll platform assembly which are retractable and have the features described above.

Other objects, features and advantages of the invention will be apparent in the following specification and claims in which the invention is described together with details to enable persons skilled in the art to practice the invention, all in connection with the best mode presently contemplated for the invention.

DETAILED DESCRIPTION OF THE INVENTION AND THE MANNER OF USING IT

Figure 1:
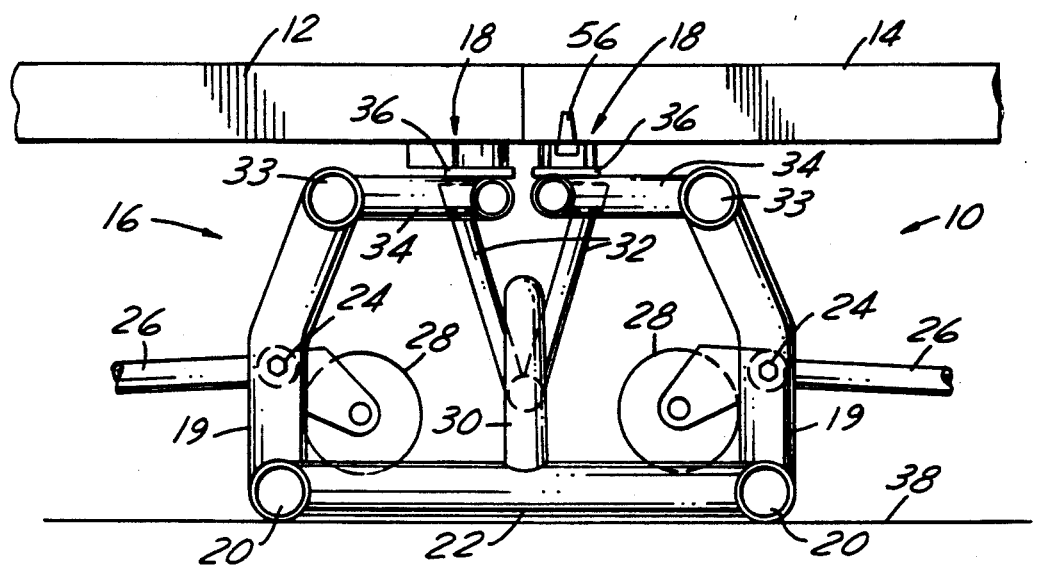
FIG. 1 is a fragmentary elevational view of a fold and roll stage assembly having panels supported in a common plane by the panel support units of this invention.

FIG. 1 illustrates a fold and roll stage assembly 10 with the two platform panels 12 and 14 supported on the supporting frame 16 by support units 18 which in this instance are of identical construction. The stage assembly has similar support systems at both sides of the panels and only one will be further described.

The supporting frame 16 has laterally spaced, generally vertical leg elements 19 pivotally connected at the bottom ends at 20 to a cross brace 22. These leg elements 19 are bent slightly between the ends where each is pivoted at 24 to an operating and stabilizing link 26 having at one end a pivotal connection to an outer leg and at the opposite end a roller 28. The outer legs do not appear in FIGS. 1 and 2 but are shown at 122 in FIG. 10 to be described hereinafter.

The cross brace 22 has a vertical post 30 pivoted to the lower ends of links 32. Arms 34 each have one end pivoted to the upper end of a link 32 and the opposite end pivoted at 33 to the upper end of a leg element 19. Plates 36 are secured to arms 34 and each arm 34 has a cylindrical hub 37. The panel support units 18 are rotatably mounted on hubs 37.

When the fold and roll assembly is folded, the panels 12 and 14 swing up into a vertical position side by side, and the rollers 28 shift downward into contact with the supporting surface 38 so that the assembly can be rolled to another location. A more detailed description of a similar assembly is shown in U.S. Pat. No. 4,779,542 assigned to the assignee of this invention.

Figure 3:
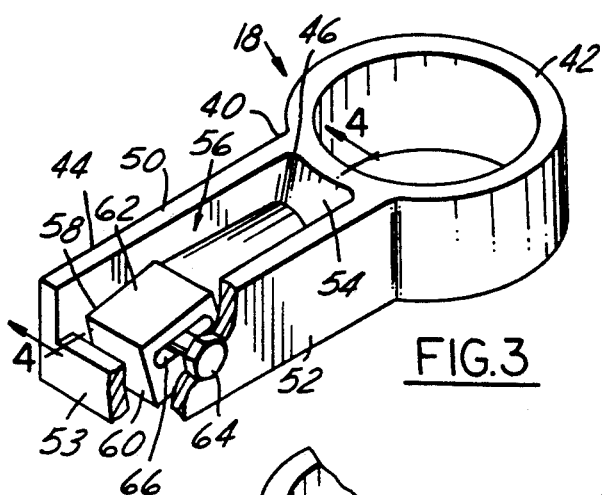
FIG. 3 is an enlarged perspective view of one of the support units shown in FIGS. 1 and 2.
Figure 4:
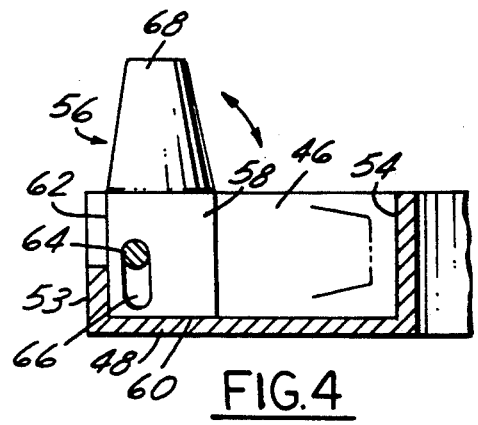
FIG. 4 is a sectional view taken on the line 4—4 in FIG. 3.

Referring to FIG. 3 and 4, each panel support unit 18 comprises a frame 40 having a circular ring portion 42 rotatably fitted on a hub 37 so that the frame 40 can swivel about the axis of the hub. A locator pin supporting part 44 of the frame projects laterally from one side of the ring portion 42. Part 44 has an elongate pocket or recess 46 which is open at the top and has a bottom wall 48 which is horizontal when the fold and roll unit is in the operative position of FIG. 1 with panels 12 and 14 in a common plane, and also has side walls 50 and 52 and end walls 53 and 54 at right angles to the bottom wall. End wall 53 is partially cut away to clear the locator pin 56 when it is pivoted.

The panel locator pin 56 has a block-like body portion 58 provided with a flat base 60 at right angles to the longitudinal center line of the pin. The body portion 58 has four sides, one of which is designated 62, at right angles to each other and to base 60. A pivot pin 64 is secured in side walls 50 and 52 of the recess and extends across the recess 46 near the end wall 53. The body portion has a slot 66 through which the pivot pin extends. The slot is elongated lengthwise of the locator pin. The locator pin has a tapered end portion 68 extending upwardly from the body portion.

The locator pin 56 may be pivoted on pivot pin 64 from the retracted position of FIG. 3 to the upwardly extending position of FIG. 4. In the retracted position, the locator pin 56 lies on its side on the bottom wall 48 of the recess 46, completely received in the recess. In the upwardly extending position, the locator pin projects above the recess with its base 60 resting flat upon the bottom wall 48 and its side wall 62 flush against the end wall 53 to stabilize the pin and hold it erect. The slot 66 provides clearance and facilitates the shifting of the locator pin from the retracted position to the upwardly extended position without interference with the recess. In the upwardly extending position, the tapered portion of the locator pin is adapted to extend into a hole 67 in panel 12 or 14 to properly locate the panel. The frame 16 can be swiveled on hub 37 to align the locator pin with a panel hole.

Figure 5:
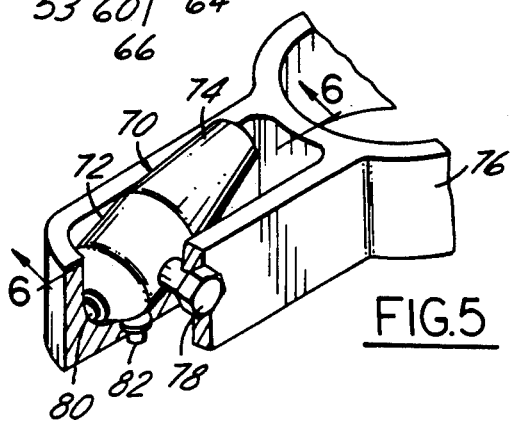
FIG. 5 is a perspective view of a panel support unit of modified construction.
Figure 6:
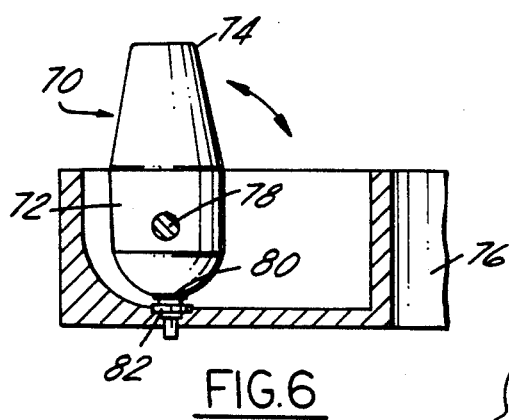
FIG. 6 is a sectional view taken on the line 6—6 in FIG. 5 but showing the locator pin upright.

FIGS. 5 and 6 show a modification in which the locator pin 70 has a cylindrical body 72 and an upwardly tapered end portion 74. The frame 76 is substantially the same as the frame in FIGS. 3 and 4, although the outer end of the recess bottom wall curves into the end wall as shown. The locator pin is mounted for pivotal movement on a pivot pin 78 extending across the recess near the outer end of the recess so that it can swing from a retracted position within the recess to an upstanding position as shown in FIG. 6. A spring-pressed button 80 protrudes from the bottom of the locator pin. A stationary retainer button 82 projects up from the bottom of the recess near the outer end of the recess. In the retracted position, the locator pin rests on its side lengthwise within the recess and below the top of the recess. In the upstanding position of FIG. 6, the tapered end of the locator pin extends above the recess and the spring-loaded button 80 presses down on the retainer button 82 to releasably hold the locator pin upright. When moved to upright position, the spring-pressed button slides across the top of the stationary button and is depressed.

Figure 7:
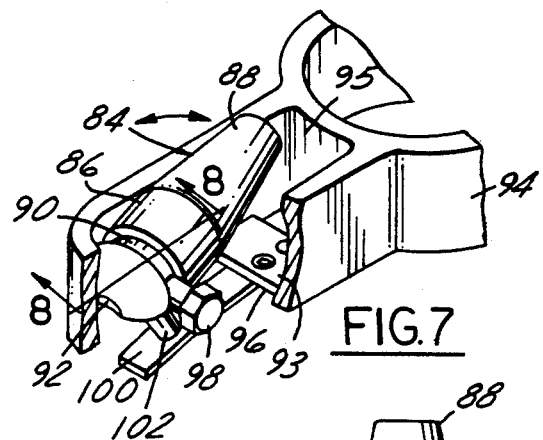
FIG. 7 is a perspective view of another panel support unit of modified construction.
Figure 8:
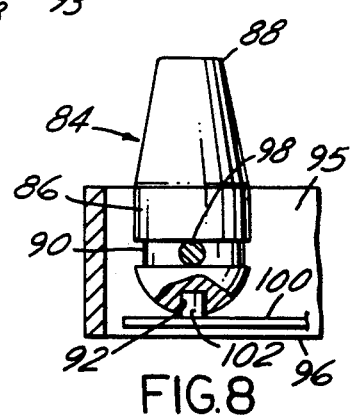
FIG. 8 is a sectional view taken on the line 8—8 in FIG. 7 but showing the locator pin upright.

FIGS. 7 and 8 show a further modification in which the locator pin 84 has a cylindrical body 86 and a tapered end portion 88. The cylindrical body has an annular groove 90 and there is a socket 92 in the bottom end. The frame 94 is similar to the frame in FIGS. 5 and 6 except that the outer end portion of the bottom wall 93 of the recess 95 is cut away at 96. A pivot pin 98 extends across the recess near the outer end and extends through the body portion of the locator pin to support the locator pin for pivotal movement from a retracted position extending lengthwise within the recess and below its upper edge to the upstanding position shown in FIG. 8.

An elongate leaf spring 100 is attached at one end to the bottom wall 93 of the recess and projects into the cut away portion 96 of the recess. This leaf spring has a projection or button 102 near its free end which projects upwardly and is adapted to engage in the socket 92 in the bottom of the locator pin when the locator pin is upright (see FIG. 8). It is a simple matter to flex the leaf spring downward to engage or disengage the button from the socket in the locator pin. When the locator pin is swung to the retracted position, the button will snap into the annular groove 90 to retain the locator pin retracted. The base of the locator pin is semi-cylindrical so that the button 102 can slide of this surface readily as the locator pin is pivoted.

Figure 9:
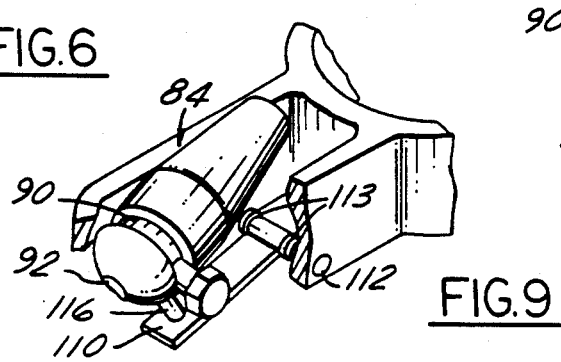
FIG. 9 is a perspective view of a still further modification.

FIG. 9 shows a modification of FIG. 8 which differs from FIG. 8 in that the leaf spring is replaced by an elongate relatively rigid latch element 110 which is hinged for vertical swinging movement on a pivot pin 112 extending across the bottom of the recess. Coil springs 113 on pin 112 at opposite sides of the latch element impose an upward bias thereon. The latch element has a projection or button 116 on its outer end, similar to the button in FIG. 8, which is engageable both in the socket 92 in the end of the locator pin 84 and in the groove 90 to hold the locator pin in either the upright or the retracted position. The locator pin and remainder of the structure of FIG. 9 is the same as in FIG. 8.

Figure 2:
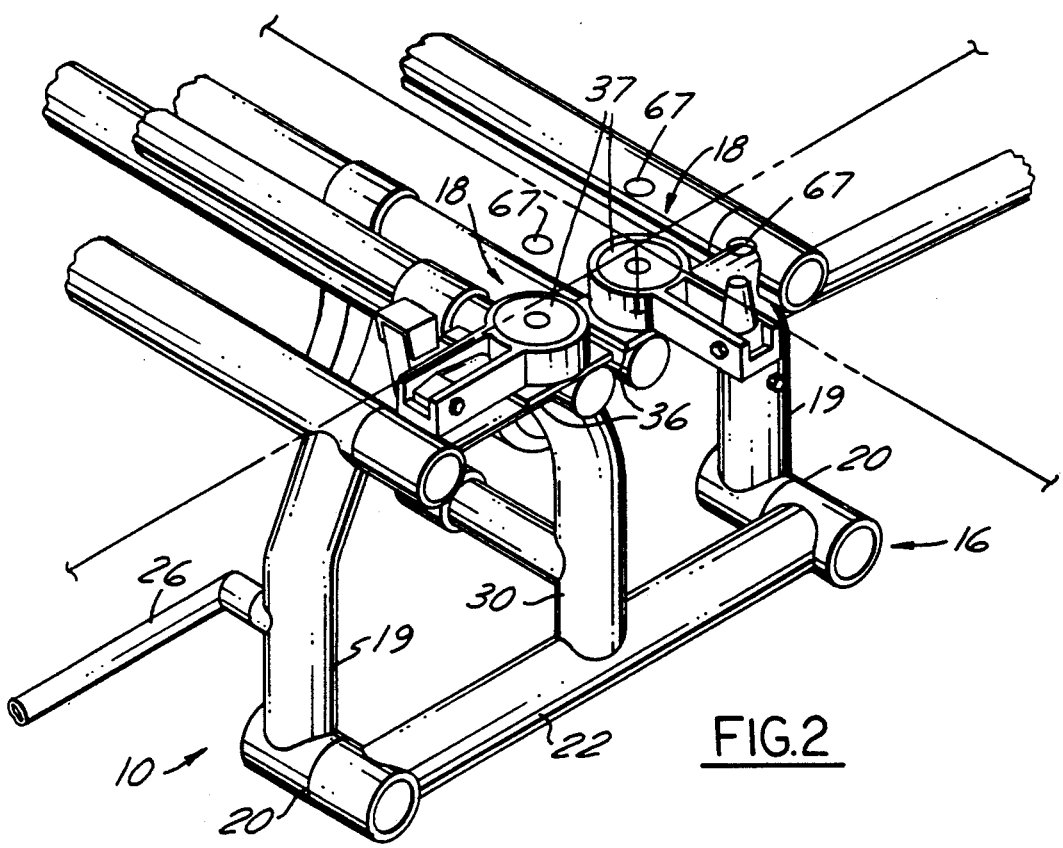
FIG. 2 is a perspective view of the stage assembly in FIG. 1 with parts omitted for clarity.
Figure 10:
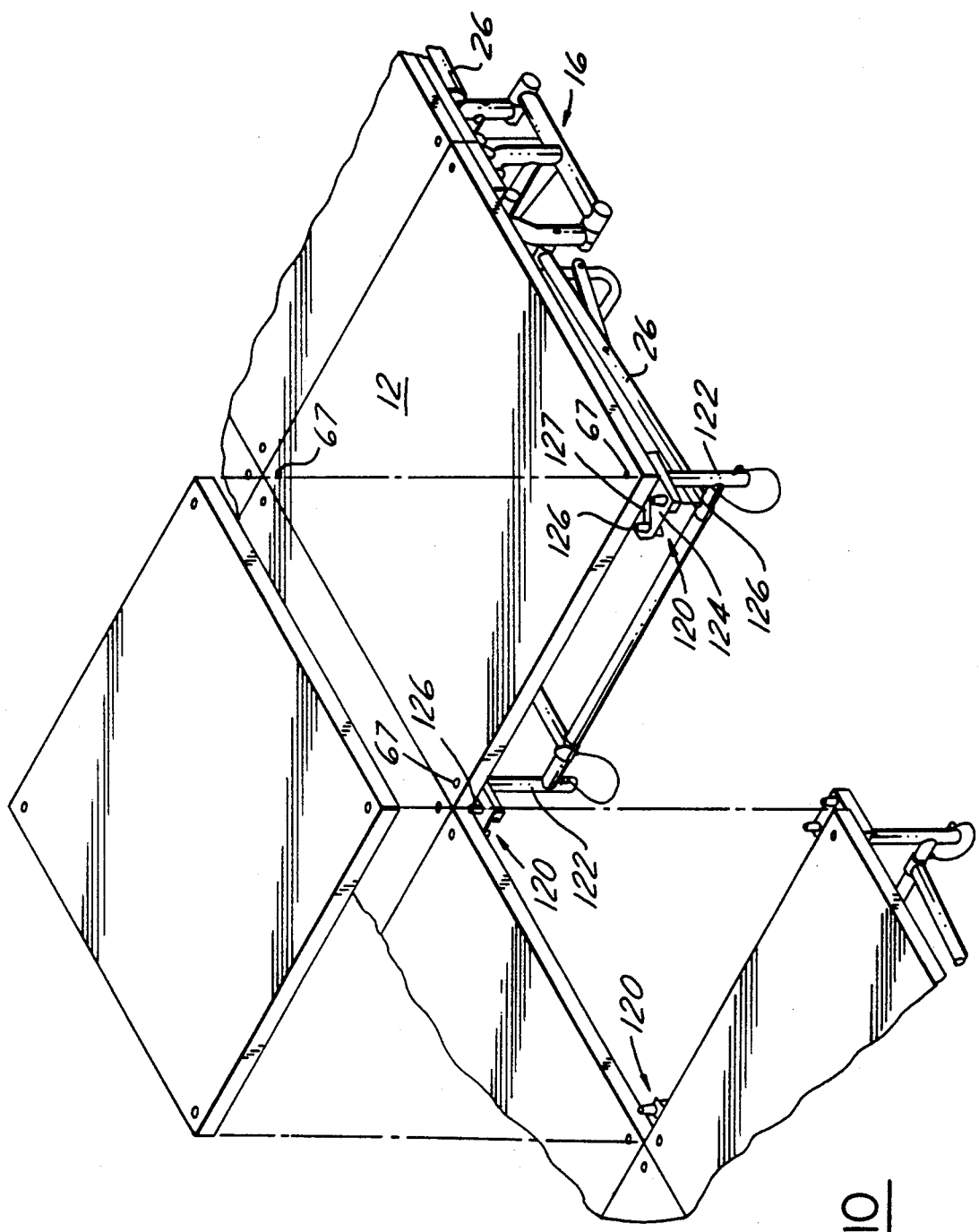
FIG. 10 is a fragmentary perspective view of the roll and fold assembly showing panel support units on the outer legs.

FIG. 10 illustrates the fold and roll assembly of FIGS. 1 and 2 and shows support units 120 for supporting the corners of panel 12 on the outer legs 122 of the supporting frame 16. The outer legs 122, which are not shown in FIGS. 1 and 2, are connected to the ends of links 26.

Support units 120 have frames 124 provided with spaced elongate open-top pockets or recesses 127 with a locator pin 126 supported in each recess. The recess and locator pin construction in FIG. 10 may be the same as described in any of FIGS. 3–9. Thus, the locator pins 126 may be individually swung to the upright positions shown for engagement in a hole 67 in one of the panels, or may be retracted into their recesses when not in use. The installed panels will rest upon the frames 124 and the upright locator pins will extend up into the corner holes 67 therein for locating purposes.

Figure 11:
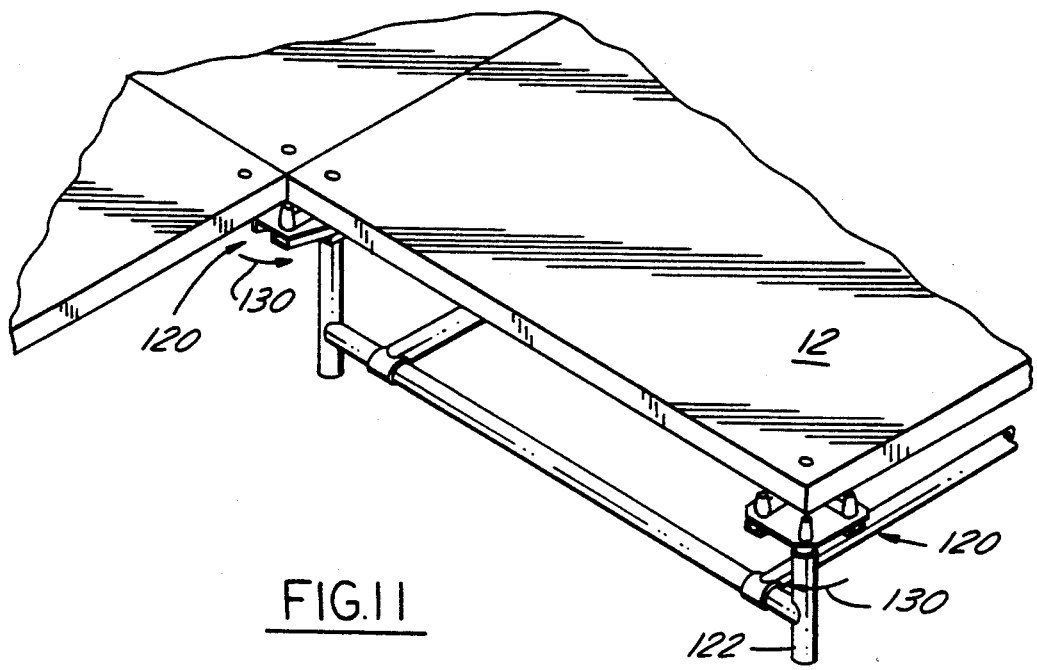
FIG. 11 is an enlargement of a portion of FIG. 10 showing one of the support units rotated from the FIG. 10 position.
Figure 12:
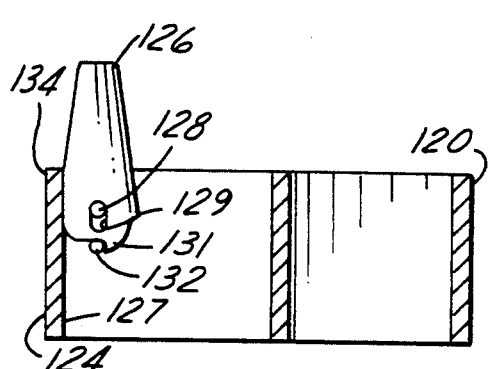
FIGS. 12-15 are sectional views showing a retractable locator pin for one or both of the support units in FIGS. 10 and 11 in various different positions with respect to the pocket or recess in which it is received.

FIG. 11 is an enlargement of a portion of FIG. 10 and shows the right support unit turned from the position of FIG. 10. The support units may be supported on the legs 122 for swiveling or rotating about the centerlines of the legs as indicated by arrows 130 to properly position the locator pins. The locator pins on each support unit preferably are arranged in a square configuration. One pin of the right support unit 120 (not shown) projects into the opening 67 of a panel and the other three are positioned to enter corner holes in three panels (not shown) to be added to the staging. Three panels are supported on the left support unit 120 located by three locator pins (not shown) and the fourth locator pin is shown upright to enter a corner hole in a panel to be added.

Figure 13:
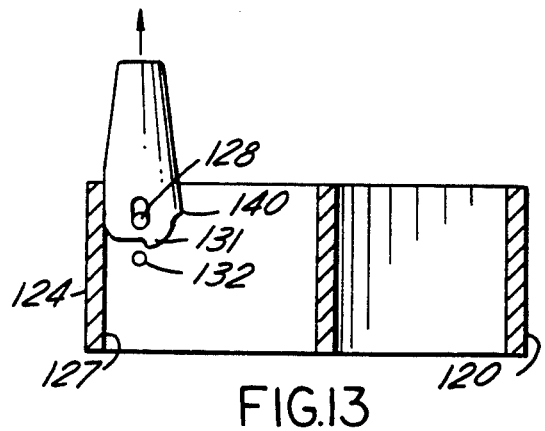
Figure 14:
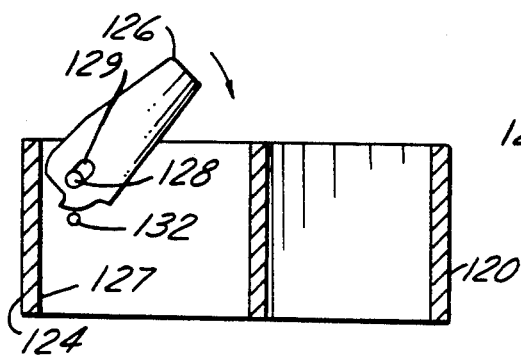
Figure 15:
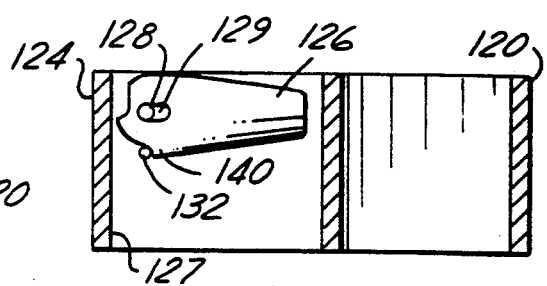

While as stated, the locator pin and recess construction may be as described and illustrated in any FIGS. 3–9, still another embodiment thereof is shown in FIGS. 12–15. As there shown, each locating pin 126 is supported in the elongate pocket or recess 127 which is open at the top. A A horizontal pivot pin 128 extends across each recess near the outer end. This pivot pin extends through an elongate slot 129 in the bottom of the locator pin. The base of the locator pin has a projection 131 adapted to hook over a transverse stop pin 132 which is beneath the pivot pin and, in cooperation with the outer wall 134 of the pocket which engages the body of the locator pin when upright, holds the locator pin in an upright position extending above the pocket and into a hole in a panel to be located. The locator pin may be rotated from a locked position to a position within the pocket by elevating it as shown in FIG. 13 and then turning it to a horizontal position as shown in FIGS. 14 and 15. In the fully stored position of FIG. 15, a second projection 140 at or near the base of the locator pin engages the stop in 132 to prevent further downward pivoting.

If desired, one of the locator pins, preferably the one directly in line with the supporting leg, may be non-retractable and permanently in an upright position.

What is claimed is:

1. In a fold and roll platform assembly having a pair of platform panels, means for supporting each of said platform panels comprising:
  a. a panel support unit having a frame,
  b. a locator pin,
  c. and means for supporting said locator pin on said frame for movement from a retracted position to an upwardly extending position to engage and locate a platform panel,
  d. said frame having walls defining an upwardly opening recess in which said locator pin is received in its retracted position and above which said locator pin projects in its upwardly extending position, e. said means for supporting said locator pin comprising a pivot pin carried by said frame and extending across said recess, said locator pin having a slot through which said pivot pin extends, and said slot being elongated lengthwise of said locator pin to facilitate turning of said locator pin without interference with the walls of said recess.

2. Structure as defined in claim 1, wherein said recess has a flat bottom wall and flat end wall, and said locator pin has a flat bottom wall and a flat side wall adapted to contact said respective bottom and end walls of said recess in said upwardly extending position to stabilize said locator pin and maintain it upright.

3. In a fold and roll platform assembly having a pair of platform panels, means for supporting each of said platform panels comprising:
  a. a panel support unit having a frame,
  b. a locator pin,
  c. and means for supporting said locator pin on said frame for movement from a retracted position to an upwardly extending position to engage and locate a platform panel,
  d. said frame having walls defining an upwardly opening recess in which said locator pin is received in its retracted position and above which said locator pin projects in its upwardly extending position,
  e. said means for supporting said locator pin comprising a pivot pin carried by said frame and extending across aid recess and about which said locator pin rotates,
  f. means for releasably retaining said aid locator pin in said upwardly extending position,
  g. said means for retaining said locator pin comprising a spring-loaded element.

4. Structure as defined in claim 3, wherein said spring-loaded element is carried by said locator pin, said recess-defining walls including a bottom wall, and a button in the bottom wall of said recess for contacting said spring-loaded element to releasably retain said locator pin in said upwardly extending position.

5. In a fold and roll platform assembly having a pair of platform panels, means for supporting each of said platform panels comprising:
  a. a panel support unit having a frame,
  b. a locator pin,
  c. and means for supporting said locator pinon said frame for movement from a retracted position to an upwardly extending position to engage and locate a platform panel,
  d. said frame having walls defining an upwardly opening recess in which said locator pin is received in its retracted position and above which said locator pin projects in its upwardly extending position,
  e. said means for supporting said locator pin comprising a pivot pin carried by said frame and extending across aid recess and about which said locator pin rotates,
  f. means for releasably retaining said air locator pin in said upwardly extending position,
  g. said means for retaining said locator pin comprises an elongate element having one end portion carried by said frame and also having an opposite end portion, a button on the opposite end portion, a socket in one end of said locator pin in which said button engages to releasably retain said locator pin in said upwardly extending position, said element being biased toward said locator pin.

6. Structure as defined in claim 5, wherein said element is a leaf spring to provide said bias.

7. Structure as defined in claim 5, wherein said one end portion of said element is carried by said frame by a second pivot pin, and coil spring means on said second pivot pin to provide said bias on said element.

8. Structure as defined in claim 5, including a button-receiving recess in a side of said locator pin to receive said button and releasably retain said locator pin in said retracted position.

9. Structure as defined in claim 8, wherein said element is a leaf spring to provide said bias.

10. Structure as defined in claim 8, wherein said one end portion of said element is carried by said frame by a second pivot pin, and coil springs on said second pivot pin to provide said bias on said element.

11. In a roll and fold platform assembly having a plurality of platform panels, means for supporting each of said platform panels comprising:
  a. a panel support unit having a frame,
  b. a locator pin,
  c. means for supporting said locator pin on said frame for pivotal movement from a retracted position to an upwardly extending position to engage and locate a platform panel,
  d. said frame having walls defining an upwardly opening recess in which said locator pin is substantially fully received in its retracted position above which said locator pin projects in its upwardly extending position,
  e. said means for supporting said locator pin comprising a pivot pin carried by said frame and extending across said recess and about which said locator pin rotates,
  f. means for releasably retaining said locator pin in said upwardly extending position,
  g. and means providing a swivel support for said frame enabling swinging of said frame about an axis spaced from said locator pin.

* * * * *